United States Patent
Janisch

(10) Patent No.: US 10,203,223 B2
(45) Date of Patent: Feb. 12, 2019

(54) DEVICE FOR DETERMINING THE ABSOLUTE POSITION OF A MOVABLE BODY

(71) Applicant: IDT EUROPE GMBH, Desden (DE)

(72) Inventor: Josef Janisch, Ilz (AT)

(73) Assignee: IDT EUROPE GMBH, Dresden (DE)

( * ) Notice: Subject to any disclaimer, the term of this patent is extended or adjusted under 35 U.S.C. 154(b) by 0 days.

(21) Appl. No.: 15/371,313

(22) Filed: Dec. 7, 2016

(65) Prior Publication Data

US 2017/0082459 A1    Mar. 23, 2017

Related U.S. Application Data

(62) Division of application No. 13/823,134, filed as application No. PCT/EP2011/065964 on Sep. 14, 2011, now Pat. No. 9,551,562.

(30) Foreign Application Priority Data

Sep. 14, 2010 (AT) .................................... 1523/2010

(51) Int. Cl.
| | |
|---|---|
| *G01R 33/06* | (2006.01) |
| *G01D 5/14* | (2006.01) |
| *G01B 7/30* | (2006.01) |
| *G01D 5/244* | (2006.01) |
| *G01B 7/14* | (2006.01) |

(52) U.S. Cl.
CPC .............. *G01D 5/145* (2013.01); *G01B 7/14* (2013.01); *G01B 7/30* (2013.01); *G01D 5/2448* (2013.01)

(58) Field of Classification Search
USPC .................... 324/225, 251, 207.25
See application file for complete search history.

(56) References Cited

U.S. PATENT DOCUMENTS

| 4,744,859 A | 5/1988 | Hu et al. |
| 5,241,270 A | 8/1993 | Ng |
| (Continued) | | |

FOREIGN PATENT DOCUMENTS

| CN | 1117577 A | 2/1996 |
| CN | 101124465 A | 2/2008 |
| (Continued) | | |

OTHER PUBLICATIONS

International Search Report for International Application No. PCT/EP2011/065964, dated Dec. 15, 2011.

(Continued)

*Primary Examiner* — Lam S Nguyen
(74) *Attorney, Agent, or Firm* — Heslin Rothenberg Farley & Mesiti P.C.

(57) ABSTRACT

In a device for determining absolute position of a mobile element in reference to two magneto-sensitive sensors, having a source of a magnetic field fastened to the element, a first sensor signal and a second sensor signal are measured with one magneto-sensitive sensor each. An amplitude ratio of the respective sensor signals and the off-set values about the respective zero point of the sensor signals are determined from the minimum and maximum values of the sensor signals, and from these values, scaled sensor signals are calculated that form a sum signal and a difference signal, which are scaled, with the determination of the minimum and the maximum values occurring by a relative movement of the element over a full range of motion, and an absolute position is calculated via the scaled sum signal and the scaled difference signal.

10 Claims, 4 Drawing Sheets

(56) References Cited

U.S. PATENT DOCUMENTS

| | | | |
|---|---|---|---|
| 5,406,202 A * | 4/1995 | Mehrgardt | G01D 5/142 |
| | | | 324/225 |
| 7,215,112 B1 | 5/2007 | Recio et al. | |
| 7,656,159 B2 | 2/2010 | Edelstein | |
| 2005/0172732 A1 | 8/2005 | Feng et al. | |
| 2009/0206827 A1 | 8/2009 | Aimuta et al. | |

FOREIGN PATENT DOCUMENTS

| | | |
|---|---|---|
| DE | 19502399 A1 | 10/1995 |
| DE | 69816755 T2 | 6/2004 |
| DE | 102007011675 A1 | 6/2008 |
| JP | H07218288 A | 8/1995 |
| WO | 00/04339 A1 | 1/2000 |
| WO | 2007/149200 A2 | 12/2007 |
| WO | 2009/088767 A2 | 7/2009 |

OTHER PUBLICATIONS

Office Action issued for corresponding Japanese application No. 2013-529662, dated Oct. 9, 2013.
Office Action issued in corresponding German patent application No. A 1523/2010 dated Sep. 13, 2011.
Office Action issued in corresponding Chinese patent application No. 201180054615.7 dated Jan. 19, 2015.

* cited by examiner

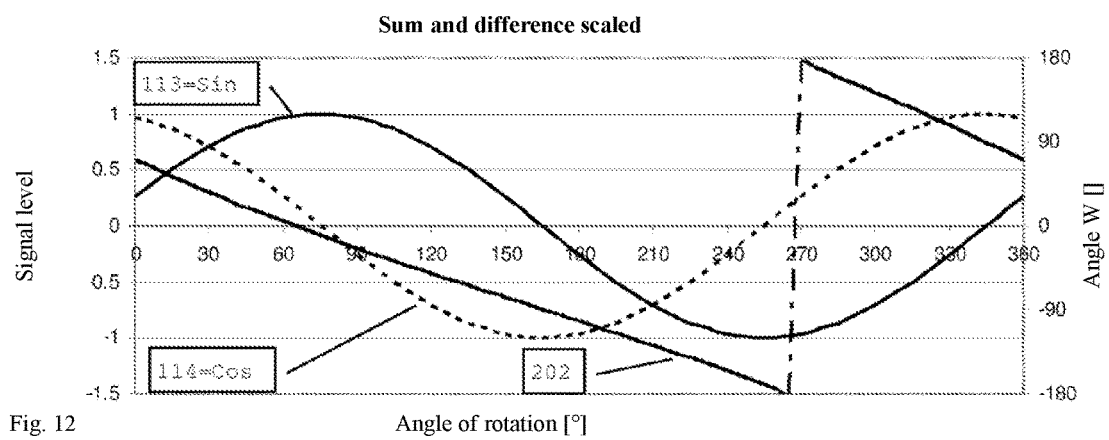
Fig. 12 Angle of rotation [°]
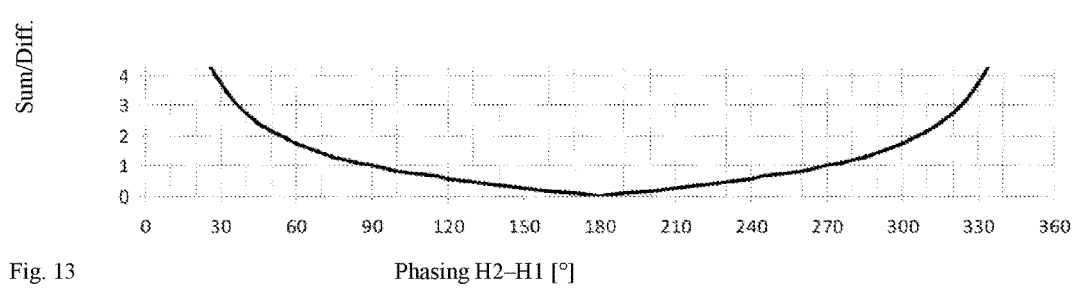
Fig. 13 Phasing H2–H1 [°]

DEVICE FOR DETERMINING THE ABSOLUTE POSITION OF A MOVABLE BODY

CROSS REFERENCE TO RELATED APPLICATIONS

This application is a divisional of U.S. application Ser. No. 13/823,134 filed on Mar. 14, 2013, which is a national stage filing of international application PCT/EP2011/065964 filed on Sep. 14, 2011, and published in German as WO 2012/035077 A1 on Mar. 22, 2012, and claims priority of Australian Application No. A 1523/2010 filed on Sep. 14, 2010, the entire content of these applications being hereby incorporated by reference herein.

BACKGROUND ART

The invention relates to a method for determining the absolute position of an element mobile in reference to two magneto-sensitive sensors, with a source for a magnetic field being fastened thereat, with its magnetic features being determined via the magneto-sensitive sensors such that a first sensor signal is measured with a first magneto-sensitive sensor and a second sensor signal with a second magneto-sensitive sensor. Here, the sensor signals representing a component of the magnetic field show a phase off-set $\varphi$ amounting to $0°<\varphi<180°$ or $180°<\varphi<360°$.

Here, in the following magneto-sensitive sensors shall particularly include Hall sensors and magneto-resistive sensors.

The invention also relates to a device for a touchless detection of a relatively mobile element comprising a source for a magnetic field fastened on the mobile element.

Due to its robustness and long lifespan the touchless determination of the absolute rotational position of a mobile body is required primarily in sensors of the automotive industry, industrial automation, devices of medical technology, and the consumer industry.

The touchless detection of the absolute angle of rotation of a rotationally supported magnet and a measuring principle based on Hall sensors is described in various patent publications.

DE 698 16 755 T2 (Austria Mikrosysteme, Jun. 3, 2004) describes a method determining the signals required for calculating the rotational position by forming the difference from two Hall sensor groups. In this method it is disadvantageous that three or four sensors are required and the device described requires an axial design in which the Hall sensors are located underneath the rotationally supported magnet.

A determination of the position of rotation by assembling the sensor at the perimeter of the source of the magnetic field, as described in this publication of an invention, is impossible using the method according to DE 698 16 755 T2, because the sensor must be fastened centrally in reference to the axis of rotation.

WO2009088767A2 (Allegro Microsystems, Jul. 16, 2009) describes two embodiments. The first embodiment (FIG. 1-47, claims 1-12) describes a design, which determines the absolute angular position via 2 or 4 Hall sensors arranged underneath the source of the magnetic field, measuring the axial magnetic field. The signal processing occurs analog. In this embodiment again an analog method is described to correct the phase off-set, with the phase off-set here must amount to $90°<\varphi<180°$.

A second embodiment, WO2009088767A (FIG. 48-55, claims 13-29) describes a design in which the sensors are fastened at the perimeter of the source of the magnetic field and measure the radial magnetic field. However, here three or four Hall sensors are required.

The method described in the publication of the uses only two Hall sensors for this type of measurement.

WO200004339 A1 (Unique Mobility Inc., Jan. 27, 2000) describes a design in which two Hall sensors are fastened at the perimeter of the source of the magnetic field such that they detect the tangential magnetic field. Furthermore, the sensors are arranged such that the measured signals show a fixed phase off-set of 90°.

Here, it is disadvantageous that the phase off-set can change by imprecisions in positioning when the Hall sensors are assembled. This error is not compensated. Furthermore, this design requires two linear Hall sensors in separate housings.

WO2008/077861 (ZF Lenksysteme, Jul. 3, 2008) describes a design in which two Hall sensors are fastened at the perimeter of a two-polar magnetized magnetic field source such that they detect the radial magnetic field. The sensors are arranged such that they show a fixed phase off-set of 90°.

Here, it is disadvantageous that the phase off-set can change by imprecisions in positioning when the Hall sensors are assembled. This error is not compensated. Furthermore, this design requires two linear Hall sensors in separate housings.

In order to achieve a phase off-set of 90° the sensors must be positioned precisely at a distance of a quarter rotation of the source of the magnetic field, resulting in relatively large space required.

US20080290859 (Timken Corp. Nov. 27, 2008) describes a design in which the absolute position of a linearly moved object or a rotational object can be determined using a multi-polar magnet. For this purpose, a group of several Hall sensors positioned serially is switched such that here a sinusoidal and a cosine signal result. Here, phase off-sets of the signals caused by the different polar lengths in reference to the length of the sensor group can be compensated via adjustments of amplification.

In this method it is disadvantageous that the absolute position can only be determined within a terminal pair of the multi-polar magnetic field source. A direct absolute determination of position over a full rotation of 360° is not possible with this method.

In US20100194385 (Moving Magnet Technologies, Aug. 5, 2010) the absolute position at the perimeter of a source of the magnetic field is determined by one sensor detecting both the radial as well as the tangential magnetic field. From these signals, naturally in their phase off-set by 90°, then the absolute angular position is calculated.

By the measurement of both the radial as well as the tangential magnetic field particular sensor types are required (lateral Hall sensors with ferromagnetic field concentrator, see Co. Melexis, Trademark Triaxis®).

Due to the sensitivity of the magnetic fields in 2 axes (x and y, respectively radial and tangential field), the sensors are sensitive regarding external magnetic fields interference.

The invention is based on the objective to provide a method for the determination of the absolute position of a mobile element, which is reliable and operates safely.

The invention is further based on the objective to provide a device to implement the method according to the invention.

BRIEF SUMMARY OF THE INVENTION

The invention relates to a method for determining the absolute position of an element mobile in reference to two magneto-sensitive sensors, with a source of the magnetic field being fastened thereat, with here the magnetic features being determined via the magneto-sensitive sensors such that a first sensor signal is measured by a first magneto-sensitive sensor and a second sensor signal by a second magneto-sensitive sensor, with the first sensor signal and the second sensor signal representing a component of the magnetic field and the sensor signals show a phasing φ in the range of 0°<φ<180° or 180°<φ<360°, with here it being provided, that amplitude ratios are determined by dividing a predetermined signal deviation by a difference of a maximum value and a minimum value of the respective sensor signals, that off-set values about the respective zero-point of the sensor signals are determined from the minimum and maximum values of the sensor signals, that via subtraction of the off-set values from the sensor signals and by scaling with the amplitude ratios here scaled sensor signals are calculated, with the determination of the minimum and maximum values occurring by a relative movement of the element and the source of the magnetic field fastened thereat over a full range of motion with simultaneously detecting the sensor signals of both sensors, that a sum signal and a difference signal is formed from the scaled sensor signals, that the sum signal and the difference signal in turn are scaled after the determination of the amplitude ratio, with the determination of the minimum and maximum values occurring by the relative movement of the element and the source of the magnetic field fastened thereat over a full range of movement occurs with simultaneously measuring the sum signal as well as the difference signal and evaluating the minimum and maximum values of the sum signal and the difference signal, and that via the scaled sum signal and the scaled difference signal an absolute rotary position of the magnetic field is calculated.

In one embodiment of the method it is provided that the components of the magnetic field represents the radial or the vertical component.

In one embodiment of the method it is provided that the mobile element is supported rotational or translational.

In one embodiment of the method it is provided that the absolute rotary position of the source of the magnetic field is calculated by forming the arc tangent of the ratio of the scaled sum signal and the scaled difference signal.

In one embodiment of the method it is provided that the absolute rotary position of the source of the magnetic field is calculated via an algorithm of the transformation of the coordinates, preferably with a CORDIC algorithm.

In one embodiment of the method it is provided that the sensor signals are greater than the white noise.

The invention further relates to a device for the touchless detection of a relatively mobile element, which comprises, fastened on said mobile element, a source of the magnetic field, with two magneto-sensitive sensors arranged in a level, spatially off-set in the direction of movement, distanced from the source of the magnetic field, with the distance between the sensors being selected such that the resulting phase off-set of the sensor signals is an amount not equal to 180° or 360°.

In one embodiment of the device it is provided that the magnetic field source comprises a multi-polar induction disk or ring magnet, which can be magnetized, showing pp terminal pairs, which allow an absolute measurable range of the rotary position of 360 degrees, divided by the number of terminal pairs.

In one embodiment of the device it is provided that the source of the magnetic field shows a 2-polar diametrically magnetized induction disk.

In one embodiment of the device it is provided that the mobile element is embodied as a rotationally supported element or a translational mobile element.

In one embodiment of the device it is provided that the sensors are integrated jointly on a sensor chip.

In one embodiment of the device it is provided that the sensor chip includes an analog/digital converter, which at the input side is connected to the output of the sensors as well as at the output side to a digital computing unit.

In one exemplary embodiment of the device it is provided that the digital computing unit shows a storage to record off-set and amplification.

BRIEF DESCRIPTION OF THE DRAWING FIGURES

In the following, the method and the corresponding device are described based on exemplary embodiments with reference to the drawings.

Figure 1:
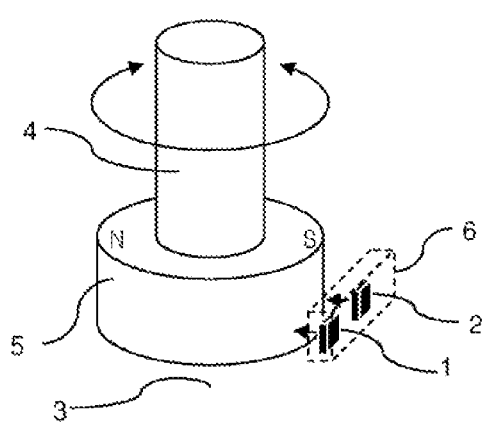
FIG. 1 shows an exemplary embodiment. The sensitive axes for measuring the magnetic field of Hall elements 1, 2 integrated on a common substrate 6 are shown as arrows.
Figure 2:
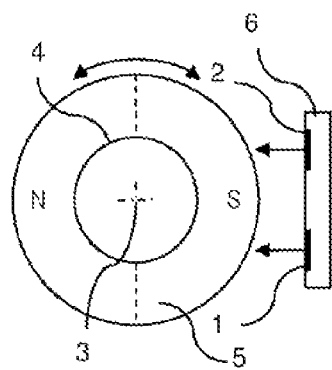
FIG. 2 shows a top view of the exemplary embodiment described in FIG. 1.
Figure 3:
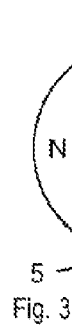
FIGS. 3-6 show different exemplary embodiments for a suitable source of a magnetic field, {ut1}
Figure 4:
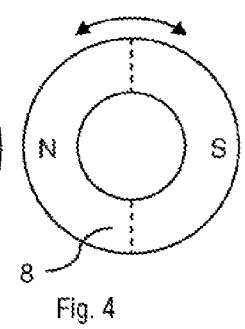
Figure 5:
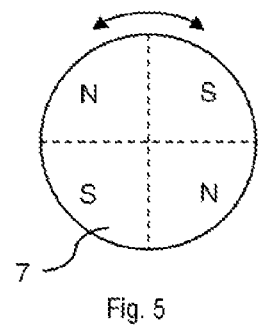
Figure 6:
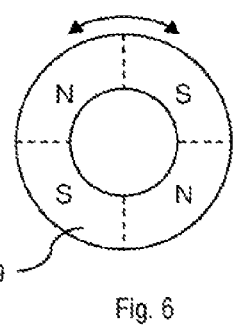
Figure 7:
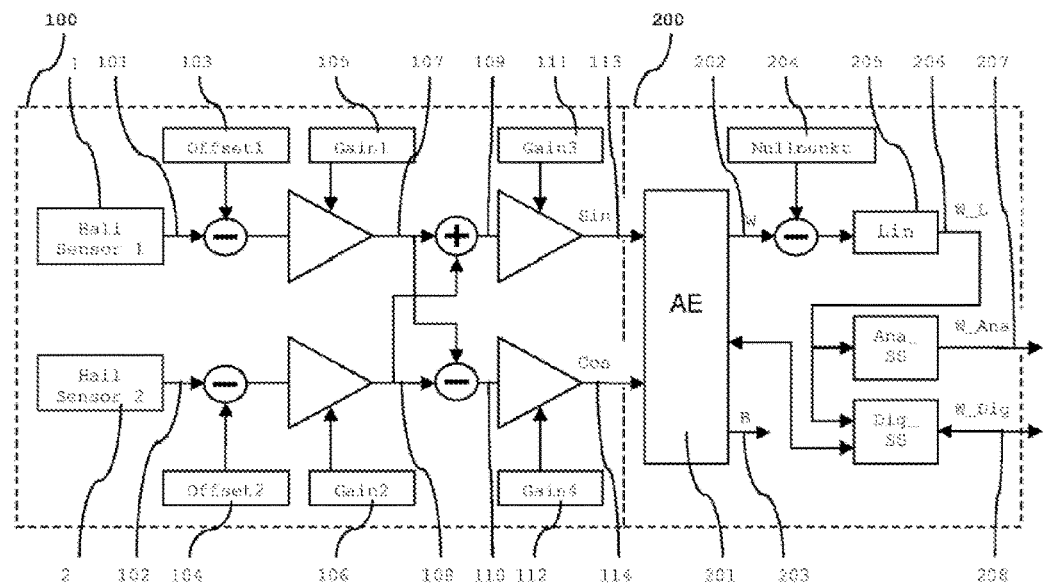
Figure 8:
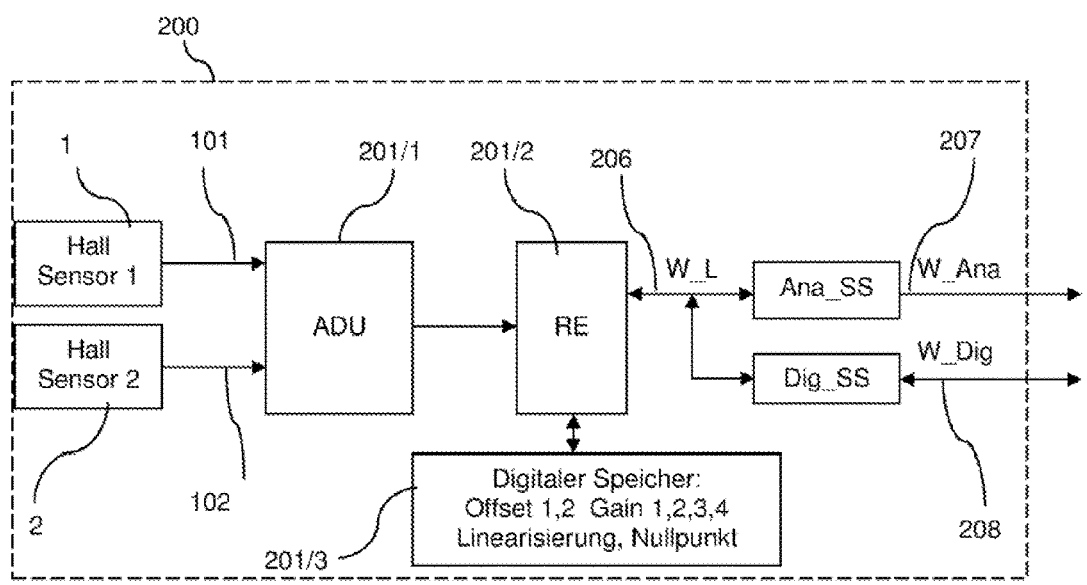

FIG. 3 and FIG. 4 depict a 2-polar diametrically magnetized induction disk 5 and/or ring magnet 8, by which it is possible to determine the absolute rotary position over 360°, FIG. 5 and FIG. 6 depict a multi-polar magnetized induction disk 7 and/or ring magnet 9, FIG. 7 depicts an analog block diagram of signal processing, FIG. 8 depicts a digital block diagram of signal processing, and FIG. 9 through FIG. 13 depict signal progressions.

DETAILED DESCRIPTION

Figure 9:
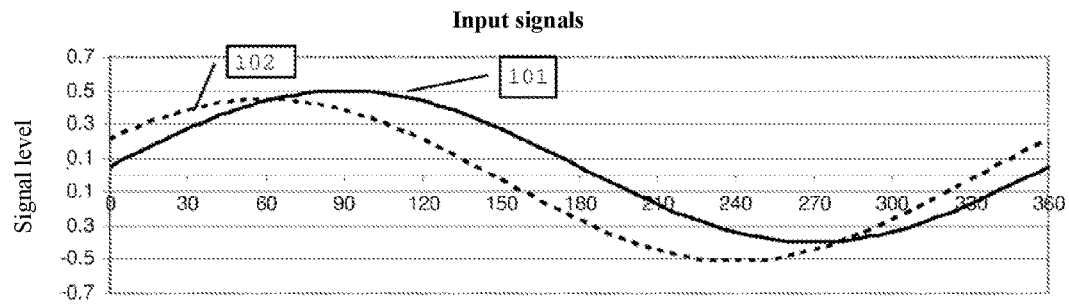
Figure 10:
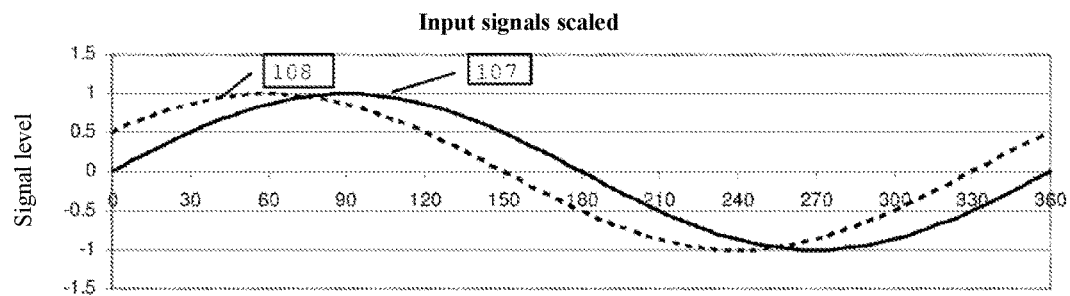

In FIGS. 9 and 10 analog signal processing paths are shown in block 100 and the digital signal processing path is shown in block 200.

In an exemplary embodiment as shown in FIG. 9, it is assumed that the measured signals of the Hall sensors 1, 2 show a phasing of 30°, already pre-amplified and, due to influences of the precision of positioning as well as technical process tolerances, subject to off-set voltages as well as subject to different signal levels.

In a first step the off-set voltage of the sensor signals 101,102 is subtracted and the signal levels are adjusted to a scaled signal deviation (for example $2V_{ss}$). The scaled signal levels are provided as signal 107 and 108 and shown in FIG. 10.

In order to calculate the required trim values for offset1, offset2, gain1, and gain2 it is sufficient to determine the minimum values as well as the maximum values of the sensor signals 101,102. This can occur by a simple rotation of the source of the magnetic field with a simultaneous determination of the minimum values and the maximum values of the sensor signals 101 and 102.

From the minimum values and maximum values then the values necessary for trimming can be calculated as follows:

$$\text{Offset1} = \frac{H1_{max} + H1_{min}}{2} \quad [1]$$

$$\text{Offset2} = \frac{H2_{max} + H2_{min}}{2} \quad [2]$$

$$\text{Gain1} = \frac{\text{scaled\_signal\_deviation}}{H1_{max} - H1_{min}} \quad [3]$$

$$\text{Gain2} = \frac{\text{scaled\_signal\_deviation}}{H2_{max} - H2_{min}} \quad [4]$$

for $H1_{max,min}$=maximum value and/or minimum value of the sensor signal1 101

$H2_{max,min}$=maximum value and/or minimum value of sensor signal2 102

Figure 11:
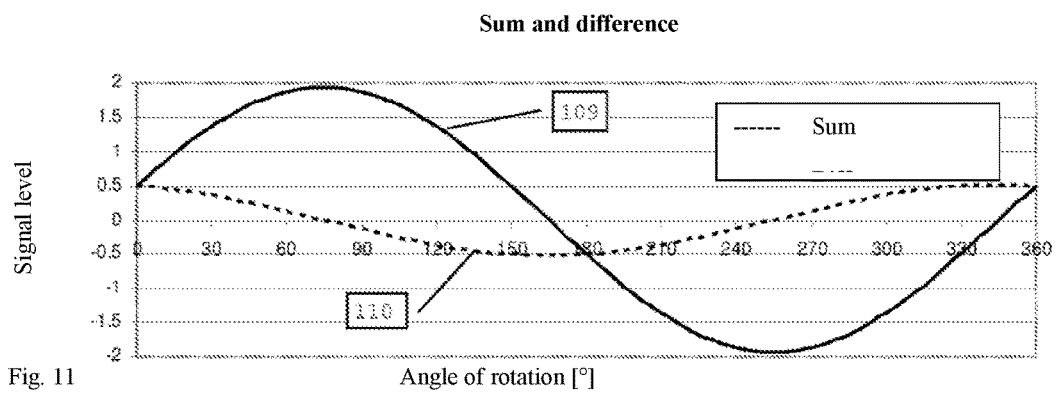

In the next step, from these scaled signals the sum 109 and the difference 110 are formed. These signals are shown in FIG. 11.

The ratio of the signal deviation of the sum total to the difference signal depends on the phasing φ of the input signals 101, 102. The phasing φ of the sum signal to the difference signal always amounts to 90°. Here, exceptions are the special cases of the phasing φ=360°=0° as well as φ=180°, in which a determination of the rotary position is impossible, because at φ=180° the sum signal becomes 0 and at φ=360°=0° the difference signal becomes 0.

In FIG. 13 this relation is shown graphically. The X-axis shows the phase ratio of the input signals 101, 102 and the Y-axis shows the amplitude ratio of the peak value of the sum signal to the difference signal.

The mathematic connection of the peak value to the sum signal is calculated by the $$\text{difference signal} = \frac{\hat{S}}{\hat{D}}$$

to the phasing from:

$$\frac{\hat{S}}{\hat{D}} = \frac{1}{\tan\left(\frac{\varphi}{2}\right)} \text{ for } 0° < \varphi < 180° \quad [3]$$

$$\frac{\hat{S}}{\hat{D}} = \frac{-1}{\tan\left(\frac{\varphi}{2}\right)} \text{ for } 180° < \varphi < 360° \quad [4]$$

In another step the sum signal 109 and the difference signal 110 are in turn scaled to a predetermined value, for example $2V_{ss}$.

In order to calculate the required trim values for gain3 and gain4 it is sufficient to determine the minimum values as well as the maximum values of the sum signal and the difference signal. This can occur by a simple rotation of the source 5 of the magnetic field over a full period with a simultaneous determination of the minimum values and maximum values of the sum signal and the difference signal.

Then, from the minimum values and maximum values the values required for trimming can be determined as follows:

$$\text{Gain3} = \frac{\text{scaled\_signal\_deviation}}{\text{sum-signal}_{max} - \text{sum\_signal}_{min}} \quad [7]$$

$$\text{Gain4} = \frac{\text{scaled\_signal\_deviation}}{\text{difference\_signal}_{max} - \text{difference\_signal}_{min}} \quad [8]$$

Assuming that the scaled sensor signals 107, 108 are equivalent to a pure sinusoidal form and show no more off-set voltage; here no additional offset develops either by forming the sum and difference. This can be controlled via the minimum and maximum values from the sum and difference signal and also be corrected, if necessary:

$$\text{Offset}_{sum\_signal} = \frac{\text{sum\_signal}_{max} + \text{sum\_signal}_{min}}{2} \quad [9]$$

$$\text{Offset}_{difference\_signal} = \frac{\text{difference\_signal}_{max} + \text{difference\_signal}_{min}}{2} \quad [10]$$

The scaled signals of the sum signal 113 and the difference signal 114 therefore result in two signals phase-shifted by precisely 90° with the same signal deviation. These signals are then directly used for calculating the position of rotation.

In the following, the scaled sum signal 113 is described by V sin and the scaled difference signal 114 by V cos.

$$V\sin = \text{Gain3}*[\text{Gain1}*(H1-\text{Offset1}) + \text{Gain2}*(H2-\text{Offset2})] \quad [5]$$

$$V\cos = \text{Gain4}*[\text{Gain1}*(H1-\text{Offset1}) - \text{Gain2}*(H2-\text{Offset2})] \quad [6]$$

For H1=sensor signal of the Hall sensor1 101
H2=sensor signal of the Hall sensor2 102
Offset1=Offset signal of the Hall sensor1 103
Offset2=Offset signal of the Hall sensor2 104
Gain1=amplification of the sensor signal H1 105
Gain2=amplification of the sensor signal H2 106
Gain3=amplification of the sum signal 111
Gain4=amplification of the difference signal 112

Starting from the input signals V sin 113 and V cos 114 the absolute rotary position W 202 of the source of the magnetic field can be determined with the help of arc tangent function $$W = \arctan\frac{V\sin}{V\cos} \quad [7]$$

or other suitable means of the transformation of coordinates, such as a digital CORDIC algorithm.

The amount B 203 of the coordinate transformation is constant for all rotary positions and amounts to:

$$B = \sqrt{V\sin^2 + V\cos^2} = \text{const.} \quad [8]$$

FIG. 12 shows the scaled sum signal 113=V sin, as well as the scaled difference signal 114=V cos.

Furthermore, a second ordinate axis shows the absolute rotary position 202, calculated from V sin and V cos, in a scaling of +/−180°.

In many applications it can be useful to adjust the calculated rotary position with a defined mechanic position of the rotational element 4, for example the zero position of a rotary adjuster. In order to facilitate this, an arbitrary rotary position may be set to zero by subtracting a zero-reference value 204.

Furthermore, the precision of the displayed rotary position yielded can optionally be increased by a linearization circuit 205. Common forms of the linearization are tables or mathematic correcting functions, which attempt to compensate the calculated rotary position to the reference points defined by the user.

Subsequently, the calculated and linearized rotary position W_L can be provided to the user by converting into an analog signal form 207 or a digital signal form 208.

In an advantageous embodiment, as shown in FIG. 8, the signal processing can be performed in a digital fashion. The signals 101, 102 generated by the Hall sensors 1, 2 are directly converted via an analog-digital converter 201/1 into a digital signal form and the signal processing steps described in FIG. 7, block 101, are performed in a digital processing unit. The parameters required here for amplification, off-set, zero point, and linearization can be stored in a digital storage unit.

If the vertical component of the magnetic field shall be analyzed, here the Hall sensors are arranged underneath the source of the magnetic field.

Using the present invention, the absolute angular position of a rotary body can be determined, with the two Hall sensors being integrated on a common substrate, measuring and evaluating the radial or the vertical magnetic field of a source of the magnetic field, fastened at the rotary body, over its circumference. The signals of the Hall sensors may show an arbitrary phasing and signal deviation in a wide range. When using a 2-polar source of the magnetic field a direct, absolute angular position can be measured over a full rotation of 360°. When using a multi-polar source of a magnetic field a direct, absolute angular position can be measured within a terminal pair. Thus, a direct, absolute determination of the position is possible over a full rotation of 360°.

Furthermore, this design allows a wide tolerance range for the adjustment of the sensor in reference to the source of the magnetic field, because the signal changes of the two Hall sensors developing from imprecise assembly can be determined and corrected in reference to phasing, off-set, and signal deviation via a reference run. For this purpose, the source of the magnetic field is moved over the angular range to be measured and here relevant signal points are measured, such as maximum and minimum values. Correction parameters are calculated from these signal points allowing to calculate from the two sensor signals, showing offset amplitudes, off-sets, and phasing, two signals off-set precisely by 90°, with the same signal level and without any off-set. These two signals are subsequently converted into a digital signal form and the absolute rotary position of the rotational body is calculated in a digital fashion.

By this way of processing the signals, using the formation of sums and differences, particularly in the area of the poles, a distinct resistance to interferences is achieved in reference to interfering magnetic fields in the regions of the angular position around 90° as well as 270°.

Due to its robustness and long life, the advantage of the invention is its application in the touchless determination of the absolute rotary position of a mobile body, primarily in sensors of the automotive industry, industrial automation, devices of medical technology, and consumer industry.

The invention allows to integrate both the sensors as well as the processing circuits on a substrate and to produce them with standard processing methods of the semiconductor industry, and here on an area as small as possible.

Due to the fact that in an advantageous embodiment of the invention the real field is detected and evaluated via two Hall sensors only, thus the magnetic field is only measured in one axis, this design is less susceptible to external magnetic fields interfering. Another improvement of the suppression of interferences is achieved by the differential evaluation of the two sensor signals. This way, particularly in the area of the poles, in the regions of the angular position around 90° and/or 270°, a distinct stability against external magnetic fields is achieved. The advantage of the invention additionally includes that a correction of the phasing is possible in the range from $0°<\varphi<180°$ or $180°<\varphi<360°$.

The advantage of the invention further comprises that two Hall sensors can be integrated in a housing.

The invention was explained in greater detail using examples and figures, with these illustrations of the invention shall not be understood as limitations thereto. It is understood that one trained in the art can implement changes and modifications without leaving the scope of the following claims. In particular, the invention comprises embodiments with any arbitrary combination of features of the various embodiments described here.

The invention claimed is:

1. A device for touchless detection of a relatively mobile element, which has a source for a magnetic field fastened on the mobile element, wherein a pair of magneto-sensitive sensors are located in a level, spatially off-set in a direction of motion, and arranged distanced from the source of the magnetic field, with distance between the sensors being selected such that a phase off-set resulting for signals from the sensors is not equivalent to 180° or 360°, wherein the sensors are integrated jointly on a semiconductor substrate of a sensor chip, and the sensor chip further comprises an analog/digital converter, which is connected at an input side with outputs of the sensors, and at an output side with a digital computing unit arranged on the sensor chip and providing a rotary position value as an analog or digital signal, and wherein magnetic features are determined via the pair of magneto-sensitive sensors such that a first sensor signal is measured by a first magneto-sensitive sensor of the pair, and a second sensor signal by a second magneto-sensitive sensor of the pair, with the first sensor signal and the second sensor signal representing a component of the magnetic field and the sensor signals having a phasing $\varphi$ in the range of $0°<\varphi<180°$ or $180°<\varphi<360°$, and wherein the digital computing unit implements the following steps:

determining amplitude ratios by dividing a predetermined signal deviation by a difference of a maximum value and a minimum value of the respective sensor signals, determining off-set values about a respective zero-point of the sensor signals from the minimum and maximum values of the sensor signals, via subtraction of the off-set values from the sensor signals and by scaling with the amplitude ratios, calculating scaled sensor signals, with the determination of the minimum and maximum values occurring by a relative movement of the element and the source of the magnetic field fastened thereat over a full range of motion with simultaneously detecting the sensor signals of both sensors, forming a sum signal and a difference signal from the scaled sensor signals, scaling the sum signal and the difference signal in turn after the determination of the amplitude ratio, wherein the determination of the minimum and maximum values occurring by the relative movement of the element and the source of the magnetic field fastened thereat over a full range of movement occurs with simultaneously measuring the sum signal as well as the difference signal, and evaluating the minimum and maximum values of the sum signal and the difference signal, and calculating, via the scaled sum signal and the scaled difference signal, an absolute position of the magnetic field.

2. The device according to claim 1, wherein the magneto-sensitive sensors comprise Hall sensors.

3. The device according to claim 1, wherein the magneto-sensitive sensors are configured such that they detect a radial component or a vertical component of the magnetic field.

4. The device according to claim 1, wherein the source of the magnetic field comprises a multi-polar magnetized induction disk or ring magnet with pp terminal pairs, which allow an absolutely measurable range of a rotary position of 360 degrees divided by a number of polar pairs.

5. The device according to claim 1, wherein the source of the magnetic field comprises a 2-polar diametrical magnetized induction disk.

6. The device according to claim 1, wherein the mobile element comprises a rotationally supported element or a translational mobile element.

7. The device according to claim 1, wherein the digital computing unit comprises a storage for recording the off-set and amplification.

8. The device according to claim 1, wherein an absolute rotary position of the mobile element is calculated by the digital processing unit by forming an arc tangent of the ratio of the scaled sum signal and the scaled difference signal.

9. The device according to claim 1, wherein an absolute rotary position of the mobile element is calculated by the digital processing unit via an algorithm of the transformation of the coordinates.

10. The device according to claim 1, wherein the sensor signals are greater than white noise.

* * * * *